Jan. 4, 1955 F. P. HILL 2,698,907

ELECTRICAL INTERFERENCE SUPPRESSING DEVICE

Filed Oct. 15, 1952

INVENTOR.
Fred P. Hill
BY
Foorman L. Mueller
Atty.

United States Patent Office 2,698,907

Patented Jan. 4, 1955

2,698,907

ELECTRICAL INTERFERENCE SUPPRESSING DEVICE

Fred P. Hill, Elgin, Ill., assignor to Motorola, Inc., Chicago, Ill., a corporation of Illinois Application October 15, 1952, Serial No. 314,840

3 Claims. (Cl. 307—89)

Figures 1, 2:
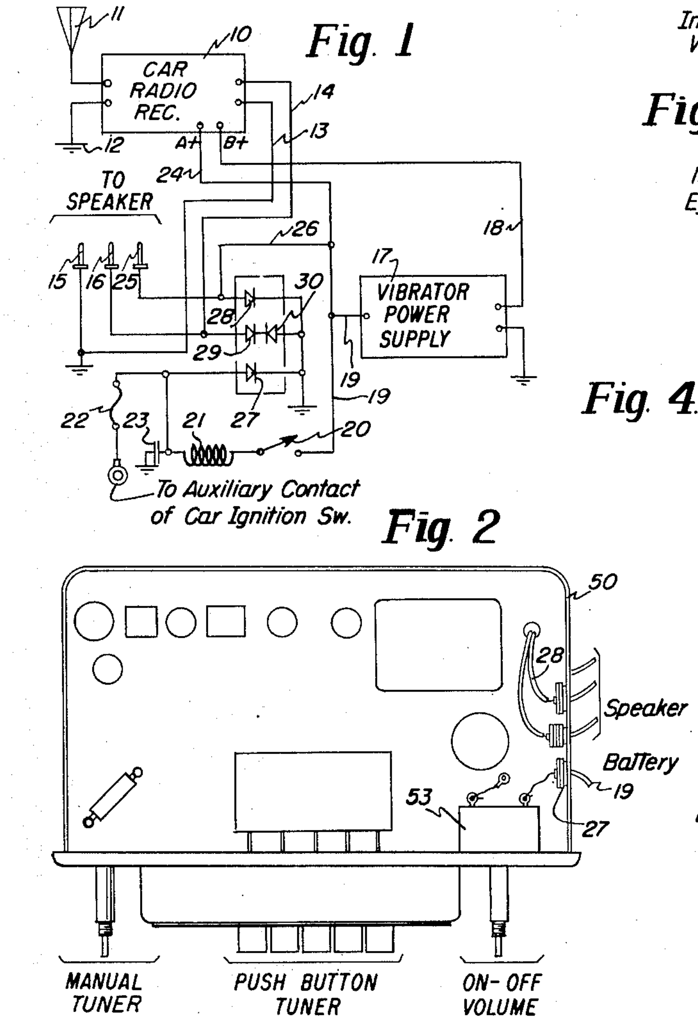

This invention relates to radio receiving systems of the type used in automotive vehicles such as automobiles or the like and is directed more particularly to a circuit for use in such a receiving system for suppressing electrical interference from the electrical system of such vehicle.

Problems have been encountered in present day radio receiving installations in automobiles or the like in rendering such installations immune to electrical interference developed by the electrical system of the automobile. It is common practice to energize such a radio receiver from the power source of the automobile, and it has been found that the power lead from the source to the receiver is subject to pick up high frequency electrical interference from the aforesaid electrical system. It has also been found that the leads from the receiver to the sound reproducing device or speaker are also subject to pick up such high frequency electrical interference.

The above problems have been solved to a large extent in the prior art by the provision of what is commonly referred to as "spark plates" between the aforementioned leads and a point of reference potential. The spark plates are in the nature of relatively large capacitors mounted on one side of the chassis of the radio receiver, with each capacitor having one side connected to the chassis, the latter being established at ground or reference potential, and with the other sides of the capacitors respectively connected to the aforementioned speaker and power leads passing through the chassis so that the undesired electrical interference picked up by these leads is effectively by-passed to the point of reference potential.

It has been found that the required capacity of the above mentioned capacitors must be as high as practical and of such mechanical construction to have a negligible inductive component in order that the capacitors may properly perform their by-passing function without presenting a high inductive impedance to the high frequency interference energy. This required minimum capacity is of the order of 400 micro-microfarads and, in order to achieve such capacity with usual dielectric materials and with a low inductive component the prior art has had to resort to capacitors that are unduly large and bulky. This can become extremely troublesome, especially in the limited space available in the receiver system.

It is an object of the present invention to provide in a radio receiving system an improved circuit for suppressing electrical interference from the electrical system of the vehicle in which the receiving system is installed, which circuit utilizes extremely small component parts so as to require a minimum amount of space within the receiver and to enable such parts to be mounted at desirable positions therein.

A further object of the invention is to provide such an improved circuit for use in a vehicle radio or the like which responds to suppress a wide frequency range of electrical interference from the electrical system of the vehicle.

A feature of the invention is the provision of a semi-conductive device (such as a selenium rectifier) between, for example, the power lead of the radio receiving system and a point of reference potential with a polarity to be non-conductive to the direct current in the lead but to present a high capacity, essentially non-inductive by-passing path to high frequency electrical interference picked up by the lead.

A further feature of the invention is the provision of a pair of semi-conductive devices in series between a point of reference potential and a lead in such receiver carrying desired low frequency current, to by-pass solely high frequency interference picked up by such lead.

Figure 3:
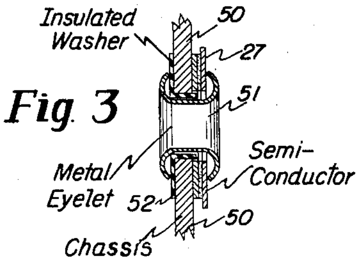
Figure 4:
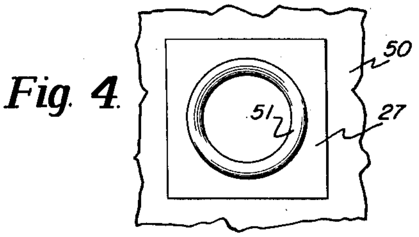
Figure 5:
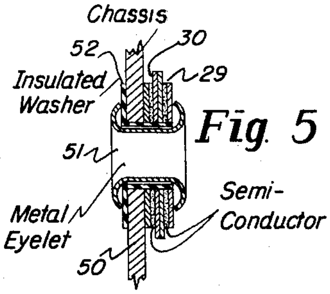
Figure 6:
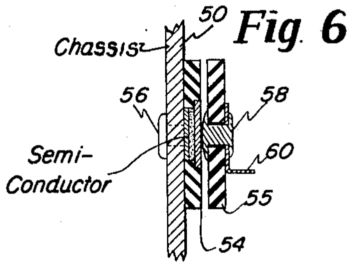
Figure 7:
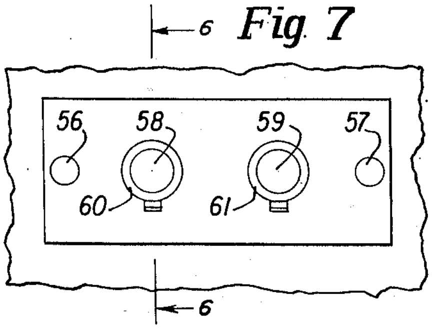

The above and other features of the invention which are believed to be new are set forth with particularity in the appended claims. The invention itself, however, together with further objects and advantages thereof may best be understood by reference to the following description when taken in conjunction with the accompanying drawing in which:

Fig. 1 is a schematic representation of a car radio receiving system incorporating the present invention, Fig. 2 shows the bottom view of the chassis of the receiver portion of such a system, Figs. 3 and 4 show various views of one possible construction of a component of the invention, Fig. 5 is a sectional view of a modified construction of the above mentioned component of the invention, and Figs. 6 and 7 are various views of other possible constructions of the component.

The present invention is directed to a circuit for use in a radio receiving system in an automobile or the like and comprises at least one lead for carrying desired electrical energy and subject to pick up undesired electrical interference in a frequency range high compared with the frequency range of the desired electrical energy, and a semi-conductive means connected between the lead and a point of reference potential and presenting high impedance to the aforesaid desired electrical energy but presenting a low inductance, high capacity path to the aforesaid electrical interference for by-passing such electrical interference to the point of reference potential.

Referring now to Fig. 1, this figure shows a receiving system including a car radio receiver 10 having input terminals connected to an antenna-ground circuit 11, 12 and output terminals 13, 14 connected to speaker plugs 15, 16. The receiving system includes a usual vibrator power supply 17 which supplies B+ potential to the receiver over a lead 18. Power supply 17 receives energy from the power source of the automobile over a lead 19 which is connected in known manner through a switch 20, choke coil 21 and fuse 22 to the auxiliary contact of the automobile ignition switch; the junction of fuse 22 and choke coil 21 being by-passed to ground through a capacitor 23. The receiver 10 obtains its "A" energy from lead 19 by way of lead 24, the latter lead being also connected to speaker plug 25 through lead 26 to supply "A" potential to the speaker field coil.

As previously stated, the power lead 19 extending to the power source of the automobile, and also the speaker leads, are subject to pick up high frequency electrical interference from the electrical system of the automobile. In order that this interference will not affect adversely the reproduction qualities of receiver 10, a semi-conductive device 27 is connected between lead 19 and a point of reference potential such as ground. The semi-conductive device may be a selenium rectifier, copper-oxide rectifier, or any other of the well known semi-conductive devices; and the device is connected with a polarity to be non-conductive to the desired direct current flowing in lead 19. It has been found that the capacity of such semi-conductive devices in their non-conductive direction is of the order of 100,000 micro-microfarads per square inch which permits a theoretical reduction in plate size as compared with most present day capacitors of the order of 1000:1 when the inductive component is essentially zero. This possible reduction in the physical size of the assembly not only provides a saving of space in the radio receiver, but also renders it possible to locate the unit in such a position within the receiver so as to provide very short take-off leads within the radio chassis. Moreover, this reduction renders it possible to position the unit in such a location as to minimize the effects of direct induction to the more sensitive elements of the receiver such as the tuner, radio frequency amplifier connection, and the like. In this fashion, the semi-conductor 27 functions as a high capacity essentially zero inductance by-pass capacitor for the interference but is insensitive to the direct current carried by lead 19. Moreover, as an additional factor such semi-conductors have inherent high leakage characteristics so that sharp resonance with the associated wiring is prevented and a broad pass-band of interference frequencies is by-passed to ground by the capacitor.

A similar semi-conductive device 28 may be provided between lead 26 and ground with a polarity to be non-conductive to the direct current carried by that lead to the speaker field, but to present a high capacity, zero inductance path to ground for the aforementioned electrical interference picked up by that lead. Speaker lead 14 may, likewise, be by-passed to ground by semi-conductive devices 29, 30. Since the latter lead carries low-frequency audio signals it is necessary to use two series-connected semi-conductors connected with opposite polarity so that neither half cycle of the audio frequency waves is by-passed to ground. As in the previous instances, devices 29 and 30 provide a high capacity, essentially zero inductance path to ground for the high frequency interference frequencies.

As shown in Fig. 2, the semi-conductive devices 27—30 may be conveniently mounted adjacent the side of chassis 50. The speaker and battery leads may be brought from and to the interior of the chassis through the semi-conductor devices and, in each case, are connected to the devices so that the latter may form a coupling path to the chassis therefor.

One possible construction for the semi-conductor devices, in order that such devices may be supported adjacent chassis 50 in a manner shown in Fig. 2, is illustrated in Fig. 3. In the latter figure semi-conductor 27, for example, is supported against chassis 50 by a metal eyelet 51 which has one end bent over to make contact with one plate of the semi-conductor and which has its other end bent over against an insulated washer 52 to hold the other plate of the semi-conductor securely against chassis 50 and in electrical contact therewith. The battery lead 19 is stripped and passed through eyelet 51 and connected to an appropriate component in the receiver, such as the on-off switch associated with volume control 53 of Fig. 2. Stripped lead 19 is soldered to the eyelet so that it is connected with one of the plates of semi-conductor 27 allowing the semi-conductor to perform its by-passing function. The front view of the assembly is shown in Fig. 4 and, as illustrated in that figure, the semi-conductor 27 may be square in shape with, for example, a side dimension of $\frac{7}{16}''$.

Fig. 5 is a sectional view of an assembly similar to that of Fig. 3, with the exception that metal eyelet 51 holds a pair of semi-conductors such as devices 29 and 30 in series-connected relation between the eyelet and the chassis to provide a by-passing path for leads such as speaker lead 14 which carries desired low-frequency alternating rather than direct current.

A further modification is shown in Figs. 6 and 7 in which the semi-conductors may be circular in form with a diameter of, for example, nine thirty-seconds of an inch; and which are supported in apertures in an insulated strip 54 having a second insulated strip 55 held thereagainst by rivets 56 and 57 passing through the strips and through the chassis 50. Strip 55 carries a pair of contacts such as contacts 58 and 59 having rounded inner heads each bearing against one plate of the respective semi-conductors to form an electrical connection therewith, and also to force the other plate of each selenium rectifier firmly against chassis 50 in electrical connection therewith. Contacts 58 and 59 support respective electrical terminals 60 and 61 which may be connected to the various leads which are to be by-passed to ground. It is evident that strips 54 and 55 may support any desired number of rectifier units.

The invention provides, therefore, an extremely compact and simple assembly for use in a radio receiving system in a vehicle such as an automobile or the like, and which assembly functions in a new and improved manner to suppress electrical interference from the electrical system of the automobile and prevent such interference from affecting adversely the reproduction qualities of the system.

While particular embodiments of the invention have been shown and described, modifications may be made and it is intended in the appended claims to cover all such modifications as fall within the true spirit and scope of the invention.

I claim:

1. In a radio receiving system the combination of at least one lead for carrying desired electrical energy and subject to pick up undesired electrical interference in a frequency range high compared with the frequency range of the desired electrical energy, and semi-conductive means connected between said lead and a point of reference potential with a polarity to present high impedance to the aforesaid electrical energy but presenting a high capacity and essentially zero inductance path to the aforesaid electrical interference for by-passing such electrical interference to said point of reference potential.

2. In a radio receiving system the combination of at least one lead for carrying desired direct current and subject to pick up undesired high frequency electrical interference, and a selenium rectifier device connected between said lead and a point of reference potential with a polarity to be non-conductive to the direct current in said lead but presenting a high capacity and essentially zero inductance path to the aforesaid electrical interference for by-passing such electrical interference to said point of reference potential.

3. In a radio receiving system the combination of at least one lead for carrying desired electrical energy and subject to pick up undesired electrical interference in a frequency range high compared with the frequency range of the desired electrical energy, and a pair of series-connected selenium rectifier devices connected between said lead and a point of reference potential with a polarity to present a high impedance path to the aforesaid electrical energy but presenting a high capacity and essentially zero inductance path to the aforesaid electrical interference for by-passing such electrical interference to said point of reference potential.

References Cited in the file of this patent

UNITED STATES PATENTS 1,784,004 Geiger et al. ............ Dec. 9, 1930